United States Patent

[11] 3,602,931

[72] Inventors David James MacArthur
Akron, Ohio;
Lawrence S. Reed, Jr., Holliston, Mass.
[21] Appl. No. 816,140
[22] Filed Mar. 5, 1969
[45] Patented Sept. 7, 1971
[73] Assignee George O. Jenkins Company
Bridgewater, Mass.
Continuation-in-part of application Ser. No. 727,237, May 7, 1968.

[54] FELTED, FIBROUS, THERMOPLASTIC SHEET FIBREBOARD FOR MOLDING RIGID SHOE COMPONENTS AND METHOD OF MAKING THE SAME AND MAKING SAID COMPONENTS THEREFROM
37 Claims, 3 Drawing Figs.
[52] U.S. Cl. .................................................... 12/146, 36/68
[51] Int. Cl. ....................................................... A43d 00/00, A43b 13/42
[50] Field of Search ............................................. 12/142, 146; 36/68; 161/64, 67, 175, 151 T

[56] References Cited
UNITED STATES PATENTS

| | | | |
|---|---|---|---|
| 2,343,390 | 3/1944 | Ushakoff .................... | 12/146 |
| 2,569,764 | 10/1951 | Jonas ........................... | 36/68 |
| 2,639,240 | 5/1953 | Ehle ............................. | 117/11 |
| 2,709,310 | 5/1955 | Crowell ........................ | 36/77 |
| 3,035,292 | 5/1962 | Heaton, et al. ............... | 12/146 |
| 3,076,987 | 2/1963 | Shuttleworth ................ | 12/142 |
| 3,239,861 | 3/1966 | Langlais ....................... | 12/146 |

Primary Examiner—Patrick D. Lawson
Attorneys—Sewall P. Bronstein and Donald Brown ABSTRACT: 25 A thermoplastic fiberboard for molding while hot on the last or on a metal form, rigid shoe components, such as counters, box toes and shanks, particularly counters, and consisting essentially of water-laid, felted paper fibers having dispersed therethrough fine particles of hard thermoplastic resin. The fiberboard and resin are moldable at a temperature between 130° F. and 170° F. but the resin is not sufficiently flowable at that temperature for the resin particles to flow together into a homogeneous mass. The maximum and minimum ratios of fiber to resin are 70/30 and 50/50, respectively, and the resin is a mixture of rosin and hard tall oil pitch resin in a ratio of between 70/30 and 40/60. The fiberboard of the invention has the favorable moldability characteristics of resin saturated fabrics now used to mold such shoe parts on the last or on a metal form, but, unlike such saturated fabrics, has the hardness, toughness, strength and resistance to crushing and breakdown characteristics of counterboard, which has been conventionally used to make such shoe parts, but the moldability characteristics of which are too poor to permit molding the shoe part on the last.

INVENTORS
DAVID JAMES MacARTHUR
LAWRENCE S. REED, JR.
BY
Dike, Thompson & Bronstein
ATTORNEYS

FELTED, FIBROUS, THERMOPLASTIC SHEET FIBREBOARD FOR MOLDING RIGID SHOE COMPONENTS AND METHOD OF MAKING THE SAME AND MAKING SAID COMPONENTS THEREFROM

This application is a continuation-in-part application of our U.S. application Ser. No. 727,237, filed May 7, 1968, now copending.

BRIEF SUMMARY OF THE INVENTION

This invention relates to a novel, felted, fibrous, thermoplastic sheet fiberboard useful in the manufacture of shoe components, such as counters, box toes and shanks. It includes the counter, box toe and shank blanks cut therefrom, the shoe components made from such blanks and the process by which the fiberboard and shoe components are made.

The counter is that rigid component of the shoe around which the curved back part of the shoe is formed. Its function is to give form, stiffness and shape retention to that part, to provide good fit insofar as possible and to give the shoe the ability to cling to the foot.

Shoe counters have for many years been molded in matched metal molds from blanks cut from moistened conventional counterboard. Conventional counterboard is a substantially wholly fibrous sheet of water-laid, felted fibers, usually paper fibers containing only a small percentage of sizing material, usually resins, to provide the desired degree of water resistance.

The rigid counter is preformed in the aforesaid molds into the general shape of the back or heel portion of the shoe upper with its lower edge crimped inwardly and horizontally into a flange which, during lasting, extends under the heel edge of the insole and is secured in place by an adhesive between the heel edge and the lower margin of the heel portion of the upper or quarter of the shoe, which lower margin is also folded under the heel edge of the insole over the flange. The upper is the prefabricated body of the shoe—that is, the shell that encases the upper portion of the foot. It is usually made up of a number of components, die-cut or pattern-cut, and then assembled by stitching or, in some instances, by adhesives.

The preformed rigid fiberboard counter is conventionally inserted into a pocket in the heel portion of the upper which is then placed on the last. While on the last the counter is secured to the shoe upper, i.e., to the quarter lining and the quarter doublers, by adhesives.

Counters properly made from good quality counterboard by the conventional preformed method are characterized by great firmness, exceptional sidewall strength as evidenced by resistance to externally applied forces, and good recovery of contour when such stresses do not exceed the elastic limit of the structure. They are quite easily fabricated and have good water resistance when formed and in the shoe.

Notwithstanding all this, the preformed counter suffers from a number of disadvantages, one major disadvantage being the difficulty of assembling it with the upper of the shoe for lasting.

Proper insertion even of a dry preformed rigid counter in the counter pocket of the upper presents difficulties. These difficulties are much increased when a wet, adhesive-coated preformed counter is inserted. In conventional practice the preformed counter is dipped into a liquid adhesive and is inserted in the counter pocket, whereupon the upper-counter assembly is placed on the last, to which the insole has been tacked, and the assembly is then secured to the insole on the last. Positioning a wet, sticky preformed counter in the counter pocket is a slow, messy and troublesome job. The counter frequently strays from the proper position due to the lubricity of the adhesive: corrective operations, and sometimes "cripples" or rejects, are the result.

A further difficulty with the preformed counter is the fact that it produces a shoe in which the fit of the back part is only an approximation.

In an effort to overcome these difficulties a number of developments have come about, all of them depending on the use of a flat, or substantially flat, counterblank in place of the preformed counter. Unlike the preformed counter, this blank is converted to counter form by being molded in the upper directly to the last or to a metal form.

Insertion of a flat, or substantially flat blank in the counter pocket is a much easier operation and when the sheet from which the blank has been cut has been coated on both sides with a dried heat-sensitive adhesive, it is obvious that a very simple method, given appropriate machinery, is available for back part forming.

A counter molded directly to the last will, in contrast to the approximations of the preformed counter, provide a more perfect fit.

However, the very nature of the operation postulates that the material of the blank must be moldable in the upper to the last: that is to say, it must, under pressure, adapt itself to the shape of the last against which, unlike preformed counters, it is molded; and it must, furthermore, be capable of accepting the sharp bends involved when the counter flange is produced in the molding operation. On the other hand, after it is so molded, it must be rendered hard and rigid before it is removed from the last and, when so rendered, it must possess those properties desirable in a counter.

One technique which has resulted in some commercial success has been the use of a limp fabric blank containing a potentially reactive resin of the urea formaldehyde type. When this resin is activated, as by dipping the blank in a solution containing a catalyst, it will in time set, causing the counter, formed in the upper counter pocket and on the last after dipping but while the blank is still limp and moldable, to become rigid and strong. This material and method, while representing an advance over preformed fibrous counters in assembly, nevertheless suffers from a number of drawbacks. The insertion of the limp, wet blank in the counter pocket is still bothersome and the operators must wear rubber gloves to avoid dermatitis. The catalyst solution introduces undesirable moisture. The most serious disadvantage is the fact that the shoe must be left on the last at least one day.

Other techniques have involved the use of fabrics saturated or impregnated with a solvent-or-heat-sensitive thermoplastic resin. Particularly, a high polystyrene-content (or, more recently, a high polystyrene butadiene or polystyrene-acrylate-content) saturated flannel has been used in the commercial production of box toes. The producers of these materials have extended their use to the area of thermal back part formation. Although this technique is now being used commercially it has met with only partial success, particularly in the field of men's and children's shoes, because the counter breaks down too easily. Other difficulties are that these materials do not skive well and lack strength in the unconsolidated condition before molding, sometimes losing corners in the skiving operation. They are easily distorted in the various handling operations and do not recover their shape as a conventional premolded fiber counter does. Because of this, operations such as stacking, stitching and back part forming are rendered more difficult.

The use of thermoplastic sheets with or without fabric has also been suggested as well as a laminate of a fiberboard containing major quantities of solvent-activated resin particles, and a fabric. None of these has met with commercial success.

Attempts have been made to use conventional fiberboard, rather than fabric, saturated with conventional resin solutions for the purpose of making the fiberboard moldable on the last. These attempts have not been successful because of difficulties in properly molding these saturated fiberboards. It is believed the reason for this is that the fibers during felting and before saturation have already become interlocked as in conventional fiberboard.

Accordingly, there has existed a long felt, recognized need for a counterblank which, after being formed on the last into a counter, more nearly approaches the characteristics of conventional premolded fiberboard counters while at the same time possessing a property the latter does not possess, that is, the capability of being easily molded on the last at moderately elevated temperatures and relatively low pressures.

The present invention successfully fills this need. It provides a counterboard, i.e., a board from which counterblanks may be cut, which has all the beneficial and desired characteristics of the conventional preformed counters made of conventional fiberboard but yet which presents no difficulties in molding on the last at the relatively low temperatures and pressures required for the back-forming operation. Its molding characteristics are fully as good, if not better, than resin-saturated flannel or other fabrics but it provides a counter having properties much closer to those of preformed fiberboard counters.

This is achieved by dispersing throughout the water-laid felted fibers of fiberboard a relatively high percentage of fine particles of a hard thermoplastic resin to thereby render the fiberboard thermoplastic and easily moldable into a counter at a molding temperature of between 130° F. and 170° F., preferably 135° F.–165° F. and more preferably 140° F.–150° F. or 140° F.–155° F. The maximum and minimum ratio by weight of fiber to resin in the thermoplastic fiberboard of the invention is 70/30 and 50/50, respectively, preferably 65/35 and 55/45, respectively. As a general rule, it is preferred to have more fiber than resin. The optimum ratio is 60/40. The resin is one which is sufficiently soft at the aforesaid molding temperature to be moldable with pressure but which is insufficiently flowable at that temperature for the resin particles to flow together to form a homogeneous matrix. This is achieved when the resin has a Ring and Ball Softening Point which is greater than the aforesaid molding temperature being used. The maximum and minimum Ring and Ball Softening Points of the resin are 190° F. and 170° F., respectively, preferably 188° F. and 175° F., respectively.

The resin is preferably a mixture of rosin and a hard tall oil pitch resin, both of which are quite inexpensive, available raw materials. The weight ratio range of rosin to hard tall oil pitch resin is between 70/30 and 40/60, more preferably between 65/35 and 50/50. The optimum ratio is 60/40. The hard tall oil pitch resin has a Ring and Ball Softening Point of between 205° and 225° F., preferably 214° F. A preferred hard tall oil pitch resin is one sold by Hercules, Inc. under the name S-1491, which is a hard, tough, thermoplastic, polymeric, relatively long chain material and which is derived from pine. A preferred rosin is a wood rosin. The rosin is effective to materially reduce the softening point (Ring and Ball) of the tall oil pitch resin to between the aforesaid 190° F. and 170° F., and to thereby reduce the temperature at which the mixture is moldable to between the aforesaid 130° F. and 170° F., particularly between 140° F.–150° F., without unduly increasing the brittleness of the mixture. These molding temperatures of 130° F.–170° F. are below the Ring and Ball Softening Point of the mixture. Nevertheless, the mixture starts to noticeably soften at about 120° F. so that it is moldable at between 130° F.–170 F. Within this temperature range, the viscosity of the mixture is too great to measure by Brookfield Viscometer.

It is believed that the softened resin particles, which are dispersed throughout the fiberboard, act as a lubricant during molding, thereby allowing the fibers to move freely with respect to each other, rather than flowing together into a homogeneous mass as in conventional plastic molding. It is also believed that the resin particles are softened sufficiently to form sticky resin globules, which are interconnected or stuck together at spaced points on their peripheries where they come in contact with each other, thereby forming a resin lacework in which the fibers are located. However, such resin particles do not coalesce sufficiently to form a continuous homogeneous resin phase, i.e., the resin does not form a solid bed or matrix in which the fibers are embedded. If molding temperatures above 170° F. are used with the resins of the present invention or if a resin is used with a Ball and Ring Softening Point substantially below 170° F., the resulting molded counter becomes brittle and tends to breakdown more easily, much like resin-saturated fabrics. It is believed that this happens because the resin becomes flowable so that the particles flow together to form a continuous and homogeneous matrix like that in resin-saturated fabrics. Thus, the thermal flow characteristics of the resin are quite important in order to achieve good moldability without brittleness, i.e., it must be soft enough to have excellent moldability at the required molding temperatures but no so flowable that the particles flow together to form a continuous, homogeneous phase.

It is essential during back-forming operations that the temperature of the shoe materials not exceed, in most cases, about 200° F., or, in any case, about 300° F., in order to prevent damage to such materials. During these operations, these materials are conventionally subjected to temperatures between 250° F.–325° F., but by keeping the dwell times short, the temperature of the materials themselves can be prevented from exceeding about 200° F. Since the heat must penetrate through these materials to reach the counterblank in the counterpocket, the temperature of such blank should not exceed about 170° F. On the other hand, in order to soften the thermoplastic resin particles in the counterblank sufficiently for good molding, the temperature of the counterblank should be raised to at least 130° F. If the resin is softened sufficiently for good molding below 130° F., it may flow under temperature conditions to which the finished shoe may be expected to be exposed, which is highly undesirable. Accordingly, it is necessary for the resin of the present invention to have the aforesaid thermal flow characteristics within the temperature range of 130° F. to 170° F.

The aforesaid thermal flow characteristics are achieved by use of a resin having a Ring and Ball Softening Point, which is above the particular molding temperature to be used within the aforesaid temperature range (this insures against excessive flow of the resin particles), which is low enough so that the resin is readily moldable at such temperature, but which is not so low that the resin will flow under normal temperature conditions to which the finished shoe will be exposed.

It is also essential that the resin contain no components which will bleed or exude from the counter under such conditions or any other conditions to which the counter or counterblank is subjected, as is true of asphalt and many plasticized resins.

Any resin having the aforesaid physical flow properties, characteristic of the aforesaid rosin-tall oil pitch resin mix, and which has corresponding physical properties of toughness and hardness at normal temperatures may be used instead of the mix.

For instance, a mixture of limed tall oil pitch (tall oil pitch treated with lime at elevated temperatures) and extracted pine wood pitch resin, such as that sold under the name VINSOL by Hercules, Inc., or a mixture of limed tall oil pitch, extracted pine wood pitch resin and rosin can be employed. Also, a mixture of an air blown (at elevated temperatures) or a formaldehyde hardened (at elevated temperatures) tall oil pitch or limed tall oil pitch and rosin can be used.

The extracted pine wood pitch referred to above is a residual product low in abietic acid remaining after the separation of refined rosin high in abietic acid from the resinous material obtained by extraction of pine wood with a solvent. Vinsol has been on the market for over 30 years. It has a melting point of approximately 225°–235° F. ring and ball method.

Limed tall oil pitch is usually made by reacting tall oil pitch with approximately 5 percent of calcium hydroxide at temperatures in the neighborhood of 220° C. (428° F.) and for periods of time that may range from 30 minutes to 5 hours. One such limed tall oil pitch is that sold under the name "Limed Tolpit" by Tenneco Chemicals, Inc. It has a Ring and Ball Softening Point of 172° F., an acid number of 20 and a Gardner Holt viscosity of A–B at 25° C.

An advantage of the counterboard of the present invention is that, although it is thermoplastic before and during molding it takes on thermosetting properties upon aging after molding.

Preferably, the tall oil pitch resin and rosin (when rosin is used) are mixed in molten condition and quenched to solidification by pouring the molten mix into cool water. The solidified mixture is then finely ground, preferably to a fineness such that the major portion, e.g., 75 percent passes through a 200 mesh screen. The particles are then blended into a furnish of paper fibers suspended in water, after which a sheet is formed in conventional manner either on a cylinder-type forming machine or on a Fourdrinier machine or on other sheet-forming equipment. The dried sheet is, in one embodiment, coated with an emulsion of a heat-sensitive adhesive which is dried. The coated sheet is then cut into flat counterblanks which may be skived. If desired, the blank may also be contoured slightly into the general shape of a clam shell.

These counterblanks can be inserted into the counterpocket of the upper quite easily, as compared to a preformed counter or a limp, saturated fabric.

EXAMPLE I

Figures 1, 2, 3:
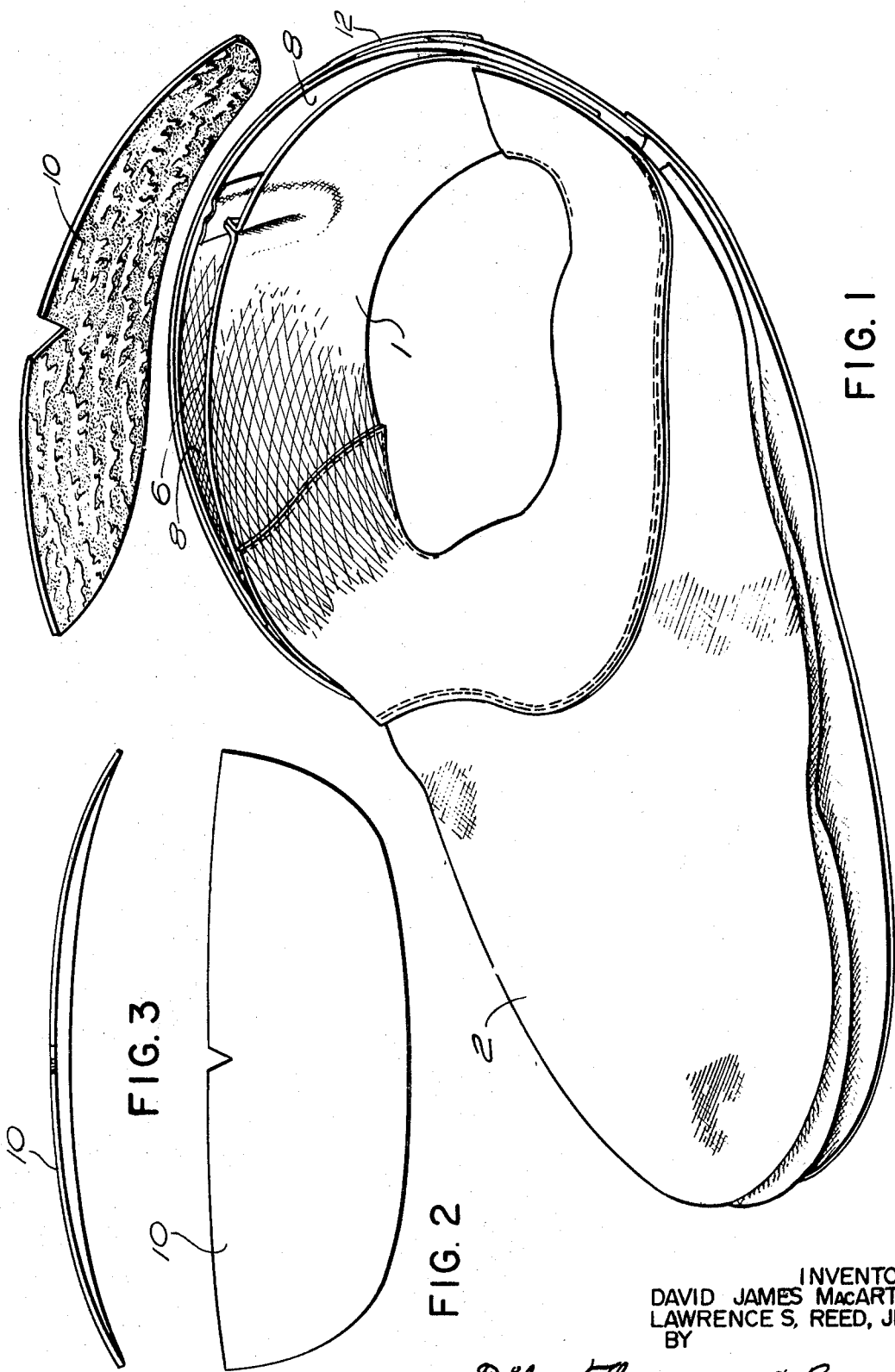
FIG. 1 is a view in perspective of a clamshell-shaped counterblank embodying the present invention and being inserted into the counterpocket of a conventional shoe upper prior to the lasting operation; the blank may be flat if desired in which case it is bent sufficiently with the fingers to permit insertion thereof into the counterpocket.
FIG. 2 is a view in elevation of the counterblank of FIG. 1.
FIG. 3 is a view in plan of the counterblank of FIG. 1.

Sixteen pounds of molten tall oil pitch resin sold by Hercules, Inc. under the name S-1491 was added to 24 lbs. of the lower melting molten wood rosin with stirring. After the mixture was rendered homogeneous it was quenched to solidification by pouring it with agitation into cold water (optionally the mixture may be chilled by other means and broken into small pieces). The solidified mix in the form of small friable pieces in the water was then dewatered and ground to a fine state of subdivisions in which 75 percent of the particles passed through a 200 mesh screen. If desired, the quenched solidified resin mix may be wet ground. Optionally the molten mix may be flowed onto a moving, chilled stainless steel belt of the Sandvik-type which delivers it in solid dry form in a condition suitable for dry grinding. For simplicity, the term "chilled" and "chilling" is used in the claims hereof to include quenching in a quenching medium and chilling by any other conventional chilling operation, e.g. by a chilled metal belt. The grinding was carried out in a Sturtevant "Simpactor" mill. Thirty-three pounds dry weight of the dry ground particles were suspended in water using soap (AJAX powdered detergent was used but any compatible soap or detergent may be used) to wet the resin particles and keep them from coalescing. This amount of resin mix allows for loss of 20 percent of the resin in the subsequent manufacturing process. For convenience, the term extracted weight ratio of fiber to resin with reference to the furnish may be used to indicate the weight ratio achieved in the finished board after normal loss of resin in the manufacturing process. Thus, the actual weight ratio of fiber to resin in the furnish will be less than the extracted weight ratio due to the amount of resin added to compensate for loss in the manufacturing process.

The resin suspension was blended into a heavily beaten (to a freeness of 250 milliliters—Canadian Standard Freeness Test) kraft paper fiber furnish containing 40 lbs. of kraft waste suspended in water. After thorough mixing, paper maker's alum was added until the pH dropped to 4.4–4.6, to thereby deposit the resin particles on the fibers and ensure maximum retention of the resin during sheet formation.

The resin-bearing fibrous slurry was then formed into sheets in conventional fashion on a laboratory wet machine. The sheets were run to a wet thickness of 0.07–0.11 inch (i.e. fiber layers were deposited on the wet machine until these wet thicknesses were built up), which provided finished sheets of between 0.035 inch and 0.050 inch, this being the conventional range of thicknesses of fiberboards used for preformed counters. After formation, the sheets were wet pressed at 125 lbs. per square inch with felt or woven plastic drainage sheets separating each sheet of board, following which they were dried at a dryer temperature which rapidly removed the water without exceeding the point at which the resin commences to noticeably soften, for example 120° F. After adjustment of the moisture content to 6 to 8 percent the sheets were rolled to a density of 0.95 to 1.05 and were then ready for use.

The resulting board, which weighed 66.6 lbs., contained 40 percent of the resin mix and 60 percent kraft, i.e. 26.6 lbs. of resin mix (20 percent was lost during board formation) and 40 lbs. of kraft waste. Of the 26.6 lbs. of resin mix 60 percent was rosin and 40 percent was tall oil pitch resin, i.e. 15.97 lbs. rosin and 10.63 lbs. tall oil pitch resin.

The sheets were then coated on both sides with a commercially available aqueous emulsion of heat-sensitive adhesive, such as that sold under the name "Ariescoat" by George O. Jenkins Company or that sold under the name "Activ 8" by the International Shoe Machinery Corporation, and the adhesive coatings were dried. In the case of "Activ 8" the dried coating was white.

The sheets were then cut into counterblanks which were passed through a counterskiving machine, the rolls of which were adjusted to give the blanks the clam shell shape (slight curvature widthwise and lengthwise) shown in FIG. 1. This shape makes for easier insertion of the counterblank 10 (FIG. 1) into the counterpocket 6 of the conventional shoe upper 2. Counter pocket 6 is formed by the quarter lining 1 and the flannel quarter doublers 8, which have been adhesively united to the leather or plastic shell 12 of the upper.

After insertion of the curved counterblank 10 into the counter pocket 6, the back part of the assembly was formed on a conventional United Shoe Machinery Corporation Back Part Former (not shown) as follows: The upper 2, containing the coated counterblank 10 in its pocket, was hung in a prewarming oven set at 250° F. where it was allowed to remain for 1 minute. Optionally it may be heated by steam. Because of the short dwell time, the temperature of the counterblank was only at 150° F. when the upper assembly was removed from the oven. This preheating operation also activated the heat-sensitive adhesive, which in the case of "Activ 8" became transparent (it was white) so that the dark natural color of the counter blank showed through indicating that the counterblank had reached the desired molding temperature. This is an advantage in using a heat sensitive adhesive of this type.

The preheated upper assembly was then placed on a conventional formed metal plug having a contour approximating that of the heel portion of the last. The plug was heated electrically at 300° F. The heel portion of the upper with the counterblank therein was pressed into conformity with the plug by foam rubber pads. The dwell time was 12 seconds. This operation partially formed the back part, including the counterblank. Since heat transfer must take place through the components of the upper and the dwell time was short the temperature never got high enough to damage the leather or the other sensitive upper materials but was sufficiently high to keep the counterblank material in condition for molding. Actually, the temperature of the counterblank did not exceed 150° F.–160° F.

The hot upper was then promptly placed on the last, which was at room temperature and to which the insole was affixed, and the assembly was inserted in the molding section of the machine. Resilient forming pads immediately applied a pressure of 25 p.s.i. (pressures between 25 p.s.i. and 50 p.s.i. are generally used) to mold the counterblank and other back part components to the last and to bond the partially formed counter 10 to the quarter liner 1 and the quarter doublers 8 through the activated adhesive. Before the lower edge of the counterblank was flanged by wiping it in under the heel seat of the insole, a hot molten thermoplastic adhesive was extruded on the heel seat in conventional manner. The wipers were then moved in to flange the counterblank against the molten adhesive, which promptly set upon chilling and provided a strong union between the components. The formed back part was removed from the last after cooling to a temperature below 120° F. at which the counter retained its shape. These molding operations are all conventional with flat, resin-saturated flannel counterblanks.

Thus, the shoe was assembled and heat-seal-lasted in one operation on the USM Back Part Forming Machine. The thermoplastic adhesive extruded onto the heel seat eliminates the tacks normally used by the heel seat laster. The counterblank molded nicely and without difficulty and the resulting counter had a stiffness, strength and crush resistance comparable to preformed fiberboard counters.

In some back part forming operations, the hot upper assembly is formed and bonded together on a cold, chilled metal form, whereafter the assembly is placed on the last to finish the lasting operation.

Table I gives a comparison of the strength and crush resistance on a "Canadian Crush Tester" of two counters molded from counterblanks made in accordance with this example (labeled Samples A1 and A2) and two counters molded from commercially available counterblanks of a polystyrene-saturated fabric (labeled B1 and B2), using the same molding conditions.

The counters A1 and A2 made from the counterblanks of this example had about double the crush resistance of the counters B1 and B2 made from the polystyrene-saturated flannel counterblanks. The crushed counters were then straightened and crushed again, with the result that the counters of this example were still high in crush resistance, approximately 75 percent of the original crush resistance, whereas the polystyrene counters' crush resistance had only 50 percent of their original resistance to crush.

TABLE I

Canadian Crush Test On Counter
Materials (Values in Pounds)

| Sample | Initial Crush | Second Crush |
|---|---|---|
| A1 | 52 | 47 |
| A2 | 48½ | 45 |
| B1 | 24 | 14 |
| B2 | 25 | 15 |

Due to the aforesaid flow characteristics of the resin mix, the properties of the formed counters of the invention can be varied somewhat with respect to flexibility, stiffness and brittleness by the magnitude of the temperatures and dwell times either in the preheater or on the plug or both and by the inclusion or omission of steam in the back forming process.

Hercules Resin S-1491 is dark in color, is nonvolatile, is relatively inert, is substantially soluble in aromatic and chlorinated hydrocarbons and is substantially insoluble in aliphatic hydrocarbons and alcohols. It has the following additional properties and contains some ester:

| Hercules Drop Softening Point | | 230° F. |
|---|---|---|
| Ring and Ball Softening Point | | 214° F. |
| Acid Number | | 35 |
| Toluene insolubles, % | | <10 |
| Gasoline insolubles, % | | >50 |
| Flash Point (C.O.C.) ° F. | | >500 |
| Iodine value | | 80 |
| Brookfield Viscosity Centipoises at | 170° C. (338° F.) | 3,000 |
| | 180° C. (356° F.) | 2,000 |
| | 190° C. (374° F.) | 1,300 |
| | 200° C. (392° F.) | 850 |
| Penetration ASTM Method D5-61(5 Seconds—100 gram load) | | |

| Temp ° F. | Penetration (0.1 mm.) |
|---|---|
| 130 | 8 |
| 150 | 35 |
| 170 | 43 |
| 190 | 82 |
| 210 | 283 |

As aforesaid, the molding temperature of the counter blank of the invention is between 130° F. and 170° F., preferably between 140° F. and 150° F., which is low enough to permit its use in any of the back part forming machines now on the market. Such molding temperature permits molding of the counterblank in the upper and to the last, as aforesaid, without exceeding temperatures at which conventional shoe materials are damaged.

The temperature at which the tall oil pitch resin referred to in the example commences to soften sufficiently is too high to permit its use alone since it is higher than the molding temperature for which conventional back part forming machines are designed. A primary reason for adding the rosin to such resin is to reduce the molding temperature of the resin to 130° F.–170 F.

If too little rosin is added, the molding temperature of the counterblank is too high. On the other hand, if too much rosin is added, the molded counters are too brittle. The proper amount of rosin to be added is that amount which will render the counterblank and the resin mix moldable between 130° F. and 170° F., preferably between 140° F.–150° F.

Brittleness caused by increasing the amount of rosin (increasing the rosin-tall oil pitch resin ratio) can be offset to some extent (1) by increasing the fiber content (increasing the ratio of fiber to resin mix) and (2) by lowering the molding temperature. This is true with respect to (1) because increasing the fiber content decreases brittleness without affecting molding temperature. It is true with respect to (2) because the increased amount of rosin will lower the temperature at which softening of the board commences to thereby permit a lower molding temperature and the lower the molding temperature within the aforesaid range, the less the brittleness.

Brittleness of the counter caused by decreasing the fiber content can be offset to some extent (1) by decreasing the amount of rosin without affecting the molding temperature, and (2) by decreasing the molding temperature.

As aforesaid, a 60/40 weight ratio of rosin to tall oil pitch resin with a 60/40 weight ratio of fiber to resin mix gives a counterblank which molds well in the temperature range of 130° F. to 170° F. into a counter which is tough and strong. With this fiber-resin mix ratio, a 70/30 rosin-tall oil pitch resin weight ratio commences to show noticeably increased brittleness in the molded counter, whereas with a 65/35 ratio, increased brittleness is hardly noticeable. With a fiber-resin weight ratio of 60/40, a rosin-tall oil pitch resin weight ratio of 40/60 gives a molding temperature somewhat higher than desired and the molding characteristics are not as satisfactory. However by decreasing the weight ratio of fibers to resin mix to about 50/50, this is in part but not wholly alleviated. A rosin to tall oil resin weight ratio of 50/50 provides an excellent counter with a 60/40 fiber-resin mix ratio although the moldability characteristics of the counterblank are not quite as good as with a 60/40 or 55/45 rosin-resin ratio.

Thus, the rosin-tall oil resin ratio may vary between 70/30 and 40/60 but preferably between 65/35 and 55/45. A 70/30 ratio has a Ring and Ball Softening Point of 175.2° F. and a 40/60 ratio has a Ring and Ball Softening Point of 187.2° F. A 60/40 ratio, which is the optimum, has a Ring and Ball Softening Point of 183.7° F. and provides excellent results at a molding temperature of 135° F.–155° F.

Accordingly, the resins which are useful in carrying out the present invention have a Ring and Ball Softening Point of between 170° F. and 190° F., preferably 175° F.–188° F., in order to achieve good molding at 130° F.–170° F. with good counter properties.

It is also apparent from the above that the ratio of the fibrous constituent (usually but not necessarily reworked kraft) to the resin mix is important in determining the moldability of the board and the properties of the molded article. This is further demonstrated in tables II and III, which follow: table II compares the results obtained with different fiber-resin mix ratios using a rosin-resin weight ratio of 60/40 whereas table III compares different fiber-resin mix ratios using a rosin-resin weight ratio of 50/50.

It should be pointed out that the tests recorded in tables II and III were performed on so-called "hand sheets," made in a standard TAPPI sheet mold. Such sheets are isotropic (i.e., nondirectional as to grain) and may not exhibit the precise performance of anisotropic (directional) sheets formed on conventional paper- or board-forming machinery, e.g. fourdrinier machines. However, the results are valid since they correspond in substance with tests of sheets made on such conventional forming equipment.

Influence of fibre/resin ratio on moldability of board and on the properties of the molded counter:

TABLE II (60/40 rosin-tall oil pitch resin ratio)

| Weight ratio of fibre to resin mix | Moldability | Properties of molded counter |
|---|---|---|
| 50/50 | Very pliable and soft. Softens in and below range of 135° F.–155° F. | Strong if molded at proper temperature within range, but sensitive to molding temperature within range. |
| 60/40 | Softens in the range 135° F.–155° F. Molds well. | Strong and tough. Not sensitive to molding temperature within range. |
| 65/35 | Fairly workable in the range 135° F.–155° F. | Fairly satisfactory. |
| 70/30 | Not as workable as the 65/35 example above within the temperature range of 135° F.–155° F. | Less satisfactory than the 65/35. |
| 75/25 | Not satisfactory | Not satisfactory. |

TABLE III (50/50 rosin-tall oil pitch resin ratio)

| Weight ratio of fibre to resin mix | Moldability | Properties of molded counter |
|---|---|---|
| 50/50 | Board very soft and pliable in range 135° F. to 155° F., with some resin flow and some resulting flex brittleness in articles molded at the higher temperature. | Under carefully controlled conditions good results are obtained, but performance is somewhat nonuniform. |
| 60/40 | Board fairly pliable in the range 135° F. to 155° F. Some resin flow at the higher temperature, but the brittleness due to the higher temperature is reduced by the higher fibre content. | Very good. |
| 70/30 | Fairly pliable in the above temperature range, but not very soft at top temperature. No resin flow. Further reduction in brittleness. | Higher molding temperatures required for best results, and these results not uniformly reproducible. |
| 80/20 | Unsatisfactory | Unsatisfactory. |

It is apparent from tables II and III that a fiber-resin mix of 60/40 gives by far the best results but that fairly satisfactory results may be obtained with boards having a fiber to mixed resin ratio of between 70/30 or 65/35 and 50/50 or 55/45. Although the minimum ratio of fiber to resin mix is 50/50, preferably there should be more fiber than resin mix.

As a general rule, optimum results are achieved where the ratio of fiber to resin mix and ratio of rosin to resin are selected so that the counterblank is readily moldable at the lowest temperature within the 130° F.–170° F. range.

EXAMPLE 2

152.5 grams molten Limed tall oil pitch resin (Limed Tolpitt) was added to 101.7 grams of the higher melting Vinsol with stirring. After the mixture was rendered homogeneous, it was quenched to solidification by pouring it with agitation into cold water (optionally the mixture may be chilled by other means and broken into small pieces). The solidified mix in the form of small friable pieces was then dewatered and ground (optionally it may be wet ground if desired). The above amount of resin mix allows for loss of 10 percent in the subsequent manufacturing process.

The resin mix was blended into a heavily beaten (freeness of 300cc-Canadian Standard Freeness Test) kraft paper fiber furnish containing 340.5 grams of kraft waste suspended in water: After thorough mixing, paper maker's alum was added until the pH dropped to 4.4–4.6 to thereby deposit the resin particles on the fibers and ensure maximum retention of the resin during sheet formation.

The resin-bearing fibrous slurry was then formed into sheets using a standard Tappi sheet mold. Such sheets are isotropic (i.e., nondirectional as to grain) and may not exhibit the precise performance of anisotropic (directional) sheets formed on a conventional paper or board-forming machinery. The hand sheets were made in a wet thickness of 0.07–0.11 inches which provided finished sheets of 0.035 inch to 0.050 inch. After formation, the sheets were wet pressed and then dried. The sheets were then rolled to a density of 0.95 to 1.05 and were then ready for use.

The resulting finished hand sheets were then preheated, either with steam or by inserting in an oven, and then molded in a matched metal mold in a Carver press. The sheets softened in the temperature range of 130° F. to 170° F., more particularly between 140° F. and 150° F.

The resulting sheet was made into shoe counterblanks which were formed into shoe counters in the same manner as example 1 with comparable results.

The ring and ball of the Limed tall oil pitch and Vinsol resin mix was 185° F.

The Vinsol aids in the achievement of good grinding and contributes to the firmness of the resulting counter. On the other hand, if too much Vinsol is added, the molding temperature is too high and the resulting counter will be too brittle. The recommended Limed tall oil pitch to Vinsol ratio range is 65/35 to 45/55, the preferred ratio being 60/40. The range of fiber to resin ratios using this resin is the same as that of example 1.

The ductility of the tall oil pitch resin mix of this example is comparable to the tall oil pitch resin-rosin mix of example 1. It will also coalesce upon standing much the same as the S-1491 and wood rosin mix of example 1.

EXAMPLE 3

40.7 grams of molten Limed tall oil pitch sold by Tenneco under the name of Limed Tolpit was added to 61.0 grams of molten Vinsol with stirring. This mixture had a ring and ball of 205° F. The molten mixture was then added to 152.5 grams of molten wood rosin with stirring. The resulting mixture had a ring and ball of 175° F.

After the mixture was rendered homogeneous, it was quenched to solidification by pouring it with agitation into cold water (optionally the mixture may be chilled by other means and broken into small pieces). The solidified mix in the form of small friable pieces was then dewatered and ground (optionally it may be wet ground if desired). The above amount of resin mix allows for a loss of 10 percent in the manufacturing process.

The resin mix was blended into a heavily beaten (freeness of 300cc.-Canadian Standard Freeness Test) kraft paper fiber furnish containing 340.5 grams of kraft waste suspended in water. After thorough mixing, paper maker's alum was added until the pH dropped to 4.4–4.6 to thereby deposit the resin particles on the fibers and ensure maximum retention of the resin during sheet formation.

The resin-bearing fibrous slurry was then formed into sheets using a standard Tappi sheet mold. Such sheets are isotropic (i.e., nondirectional as to grain), and may not exhibit the precise performance of anisotropic (directional) sheets formed on a conventional paper on board-forming machinery, but good enough to show molding characteristics and sidewall firmness. The hand sheets were made in a wet thickness of 0.07–0.11 inch which provided finished sheets of 0.035 inch to 0.050 inch. After formation, the sheets were wet pressed and then dried. The sheets were then rolled to a density of 0.95 to 1.05 and were then ready for use.

The resulting finished hand sheets were then preheated, either with steam or by inserting in an oven, and then molded in a matched metal mold in a Carver Press. The sheets softened in the temperature range of 130° F. to 170° F., particularly between 140° F. and 150° F.

The resulting sheet was made into shoe counterblanks which were formed into shoe counters in the same manner as example 1 with comparable results.

The Vinsol serves the same function in this example as in example 2. It also increases the ring and ball of the Limed tall oil pitch to approximate the ring and ball of S-1491, whereupon wood rosin is added to lower the melt point to the desired ring and ball range of 170° to 190° F.

The ring and ball of the Vinsol and Limed tall oil pitch in example 3 was 205° F. and the ring and ball of the Limed tall oil pitch, Vinsol, and wood rosin is 175° F.

If too little Vinsol is added to the Limed tall oil pitch, then the ring- and ball-softening point will be too low. If too much Vinsol is added to the Limed tall oil pitch, then the ring and ball will be too high to be brought down to 170°–190° F. by the addition of wood rosin, and the resulting counter will be too hard and brittle.

The range of ratios of fiber to the three component resin mix of this example is the same as that in example 1.

The range of ratios of the rosin to the Limed tall oil pitch—Vinsol Mix may be between 65/35 and 50/50, preferably between 65/35 and 55/45.

The range of ratios of the Limed tall oil pitch to Vinsol may be between 55/45 and 35/65.

The recommended wood rosin, Limed tall oil pitch and Vinsol ratio ranges are 65/12/23 to 55/25/20. The ductility of this resin mix is comparable to the resin mix of S-1491 and wood rosin. The resulting mixture will also coalesce upon standing, much the same as S-1491 and wood rosin combination.

Although paper fibers are preferred, other fibers, particularly cellulosic, may be used.

Although the counterboard of the invention is particularly useful in making shoe counters, it may also be used for making box toes and shanks for shoes.

We claim:

1. A blank for a rigid shoe part, said blank consisting essentially of a thermoplastic fiberboard of water-laid, dried felted nonmetallic fibers having dispersed therethrough fine particles of a hard ductile thermoplastic resin, said fiberboard and resin being heat moldable into said shoe part at a temperature of between 130° F. and 170° F., the maximum ratio by weight of fiber to resin in said fiberboard being 70/30.

2. A blank according to claim 1, said resin being insufficiently flowable at said temperature for said particles to flow together to form a homogeneous matrix.

3. A blank according to claim 1, said molding temperature being below the Ring and Ball Softening Point of said resin, the minimum ratio of fiber to resin being 50/50.

4. A blank according to claim 1, said resin having a Ring and Ball Softening Point not more than 190° F. and not less than 170° F.

5. A blank according to claim 1, said resin comprising a mixture of hard tall oil pitch resin and rosin.

6. A blank according to claim 5, the minimum ratio by weight of fiber to resin mixture in said fiberboard being 50/50.

7. A blank according to claim 6, said tall oil pitch resin having a Ring and Ball Softening Point not greater than 225° F. and not less than 205° F., said resin mixture having a Ring and Ball Softening Point not greater than 190° F. and not less than 170° F.

8. A blank according to claim 6, the weight ratio of rosin to tall oil pitch resin being between 70/30 and 40/60.

9. A blank according to claim 8, having a coating of a dry heat sensitive adhesive.

10. A blank according to claim 6, the ratio of fiber to resin mixture being 60/40 and the ratio of rosin to tall oil pitch resin being 60/40.

11. In a method of making a shoe, the improvement comprising applying to a partly completed shoe to form an assembly for lasting, a blank for a rigid shoe part, said blank consisting essentially of a thermoplastic fiberboard of water-laid, felted nonmetallic fibers having dispersed therein particles of a hard ductile thermoplastic resin, the maximum and minimum ratio by weight of fiber to resin in said fiberboard being 70/30 and 50/50, respectively, heating said blank in said assembly to a molding temperature of between 130° F. and 170° F., applying said assembly to a last or a form having the approximate shape of the last, molding said blank in said assembly on said last or form to the shape of said part and cooling said molded blank in said assembly to below said molding temperature to form said part, said resin being insufficiently flowable during said molding operation at said molding temperature for said particles to flow together to form a homogeneous mass.

12. A method according to claim 11, the maximum and minimum Ring- and Ball-Softening Point of said resin being 190° F. and 170° F., respectively.

13. A method according to claim 11, said molding temperature being below the Ring- and Ball-Softening Point of said resin.

14. A method according to claim 11, said resin comprising a mixture of rosin and a hard tall oil pitch resin, said rosin being effective to lower the molding temperature of said tall oil pitch resin to said 130° F. to 170° F.

15. A method according to claim 14, the weight ratio of rosin to tall oil pitch resin being between 70/30 and 40/60.

16. A method according to claim 15, said resin and rosin being mixed while molten and chilled to solidification, said chilled mixture being ground into said resin particles.

17. A method according to claim 16, said chilled mixture being ground to a particle size at which at least the major portion of the particles pass through a 200 mesh screen.

18. A method according to claim 11, the amount of fiber by weight being greater than the amount of resin, said blank having a coating of a dry heat-sensitive adhesive which is effective to bond said blank in place in said partly finished shoe by said heating operation.

19. A thermoplastic fiberboard for a rigid shoe part consisting essentially of water-laid, dried felted nonmetallic fibers having dispersed therein fine particles of a hard ductile thermoplastic resin, said fiberboard and resin being moldable at a temperature of between 130° F. and 170° F., the maximum ratio by weight of fiber to resin being 70/30, said resin comprising a hard tall oil pitch resin.

20. A fiberboard according to claim 19, said resin comprising a mixture of hard tall oil pitch resin and rosin, the minimum weight ratio of fiber to resin mixture being 50/50.

21. A fiberboard according to claim 20, the weight ratio of rosin to tall oil pitch resin being between 70/30 and 40/60.

22. A fiberboard furnish comprising an aqueous dispersion of fibers and fine particles of a hard ductile thermoplastic resin, said resin comprising a mixture of a hard tall oil pitch resin and rosin, the maximum and minimum extracted weight ratio of fiber to resin mixture being 70/30 and 50/50, respectively, the weight ratio of rosin to tall oil pitch resin being between 70/30 and 40/60.

23. A method of making a fiberboard comprising intimately mixing together molten tall oil pitch resin and molten rosin, chilling the molten mixture to solidification, grinding the solidified mixture to fine particles, adding the ground mixture and fibers to water to form an aqueous dispersion of said fibers and particles, the maximum extracted weight ratio of fibers to resin particles being 70/30, the weight ratio of rosin to tall oil pitch resin being between 70/30 and 40/60, reducing the pH of the dispersion to deposit the particles on the fibers forming a water-laid, felted sheet from said dispersion and drying said sheet without fusing together said particles.

24. A rigid shoe part, said part being made by heat molding a thermoplastic fiberboard blank consisting essentially of water-laid, dried, felted nonmetallic fibers having dispersed therethrough fine particles of a hard ductile thermoplastic resin, the maximum and minimum weight ratios of fiber to resin being 70/30 and 50/50, respectively, said part being heat molded at a fiberboard temperature of 130° F.–170° F., said resin being present in the shoe part in the form of a nonhomogeneous mass.

25. A shoe part according to claim 24, said resin consisting of a mixture of rosin and hard tall oil pitch resin, the weight ratio of the latter to the former being between 70/30 and 40/60.

26. A blank according to claim 1, wherein said shoe part is a counter.

27. A method according to claim 11, wherein said shoe part is a counter and said resin comprises a hard tall oil pitch resin.

28. A blank for a rigid shoe part, consisting essentially of a thermoplastic fiberboard of felted nonmetallic fibers having dispersed therethrough fine particles of a resin comprising a hard, ductile tall oil pitch resin, said fiberboard and resin being moldable at a temperature of between 130° F. and 170° F., the maximum ratio by weight of fiber to resin being 70/30.

29. A blank according to claim 28, said resin also including an extracted pine wood pitch resin.

30. A blank according to claim 29, said tall oil pitch-extracted pine wood pitch resin being mixed with rosin.

31. A blank according to claim 29, said tall oil pitch resin being a limed tall oil pitch.

32. A blank according to claim 1, the amount of fibers by weight being greater than the amount of resin.

33. A blank according to claim 6, the amount of fibers by weight being greater than the amount of resin mixture.

34. A blank according to claim 28, the minimum ratio by weight of fiber to resin being 50/50.

35. A method according to claim 23, the minimum extracted weight ratio of fibers to resin particles being 50/50.

36. In a method of making a shoe, the improvement comprising applying to a partly completed shoe to form an assembly for lasting, a blank for a rigid shoe part, said blank consisting essentially of a thermoplastic fiberboard of water-laid, felted nonmetallic fibers having dispersed therein particles of a hard ductile thermoplastic resin, the maximum ratio by weight of fiber to resin in said fiberboard being 70/30, heating said blank in said assembly to a molding temperature of between 130° F. and 170° F., applying said assembly to a last or a form having the approximate shape of the last, molding said blank in said assembly on said last or form to the shape of said part and cooling said molded blank in said assembly to below said molding temperature to form said part, said resin being insufficiently flowable during said molding operation at said molding temperature for said particles to flow together to form a homogeneous mass.

37. A rigid shoe part, said part being made by heat molding a thermoplastic fiberboard blank consisting essentially of water-laid, dried, felted nonmetallic fibers having dispersed therethrough fine particles of a hard ductile thermoplastic resin, the maximum weight ratio of fiber to resin being 70/30, said part being heat molded at a fiberboard temperature of 130° F.–170° F., said resin being present in the shoe part in the form of a nonhomogeneous mass.